(12) United States Patent
Yun et al.

(10) Patent No.: US 11,293,499 B2
(45) Date of Patent: Apr. 5, 2022

(54) CLUTCH DEVICE FOR TRANSMISSION

(71) Applicants: Hyundai Motor Company, Seoul (KR); Kia Motors Corporation, Seoul (KR)

(72) Inventors: Seong Eun Yun, Bucheon-si (KR); Dong Woo Gwak, Hwaseong-si (KR); Sung Wha Hong, Hwaseong-si (KR); Jong Yun Park, Hwaseong-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 17/089,178

(22) Filed: Nov. 4, 2020

(65) Prior Publication Data

US 2022/0010847 A1   Jan. 13, 2022

(30) Foreign Application Priority Data

Jul. 10, 2020 (KR) .................. 10-2020-0085398

(51) Int. Cl.
| | |
|---|---|
| F16D 25/12 | (2006.01) |
| F16D 25/0638 | (2006.01) |
| F16D 25/061 | (2006.01) |
| F16D 21/00 | (2006.01) |
| F16D 11/14 | (2006.01) |
| F16D 13/52 | (2006.01) |
| F16D 11/00 | (2006.01) |

(52) U.S. Cl.
CPC .............. *F16D 25/12* (2013.01); *F16D 11/14* (2013.01); *F16D 13/52* (2013.01); *F16D 21/00* (2013.01); *F16D 25/061* (2013.01); *F16D 25/0638* (2013.01); *F16D 2011/004* (2013.01); *F16D 2011/008* (2013.01)

(58) Field of Classification Search
CPC .. F16D 2011/004; F16D 11/14; F16D 25/061; F16D 13/52; F16D 21/00
See application file for complete search history.

(56) References Cited

U.S. PATENT DOCUMENTS

| | | | | |
|---|---|---|---|---|
| 2017/0144540 | A1* | 5/2017 | Kincaid | B60K 23/08 |
| 2019/0154089 | A1* | 5/2019 | Brezger | F16D 11/14 |
| 2020/0224733 | A1* | 7/2020 | Kato | F16D 47/00 |
| 2021/0054883 | A1* | 2/2021 | Grethel | F16D 13/683 |

FOREIGN PATENT DOCUMENTS

KR   10-1998-0050337 A   9/1998

* cited by examiner

*Primary Examiner* — Stacey A Fluhart
(74) *Attorney, Agent, or Firm* — Morgan, Lewis & Bockius LLP

(57) ABSTRACT

A clutch device configured for a transmission may include a first body and a second coaxially mounted to the first body; a friction element mounted between the first body and the second body; a friction piston configured to axially press the friction element by use of hydraulic pressure; a retractable mechanism including a dog clutch, which is configured to restrict rotation between the first body and the second body, and repeatedly engaging and disengaging the dog clutch by repeatedly applying pressure in axial direction thereof; and an operation piston configured to provide pressure to the retractable mechanism in an axial direction of the retractable mechanism.

17 Claims, 16 Drawing Sheets

CLUTCH DEVICE FOR TRANSMISSION

CROSS REFERENCE TO RELATED APPLICATION

The present application claims priority to Korean Patent Application No. 10-2020-0085398, filed Jul. 10, 2020, the entire contents of which is incorporated herein for all purposes by this reference.

BACKGROUND OF THE INVENTION

Field of the Invention

The present invention relates to the configuration of a power control device which is used in a transmission.

Description of Related Art

An automotive automatic transmission, etc. can engage desired gears using several power control devices that are operated by hydraulic pressure.

That is, it is possible to shift into various gears by engaging or disengaging rotation elements of planetary gear sets using several power control devices such as a clutch or a brake.

The 'clutch' is a device that engages or disengages two rotors that are respectively rotated and the 'brake' is a device that converts the state in which one rotation element is stopped and the state in which one rotation elements is rotated when one of two portions is a fixed portion such as a transmission housing.

That is, the clutch and the brake are almost the same in the actual configuration except for whether the objective portions are all rotors or not.

A mechanism in which both of a clutch and a brake include a disc set configured by alternately stacking several discs and plates between two parts, and engage or disengage the two portions by changing the friction between the discs and plates by pressing the disc set using hydraulic pressure is used in the hydraulic automatic transmission of the related art.

A power control device which is a concept including a clutch and a brake, as described above, is referred to as a 'clutch device' herein in combination, including a brake, to be discriminated from single clutch.

The clutch device used in transmissions of the related art, as described above, needs several discs and plates for a disc set, and the larger the torque the disc set has to transmit or receive, the more the discs and plates may be used.

However, as described above, when the numbers of plates and discs of a disc set are increased, the drag which is generated therebetween also increases, which becomes a main factor that consumes power even though a clutch device is not operated, which results in reduction of the power transmission efficiency of a transmission.

The description provided above as a related art of the present invention is just for helping understanding the background of the present invention and may not be construed as being included in the related art known by those skilled in the art.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a clutch device configured for a transmission, the clutch device configured to improve the power transmission efficiency of a transmission to consequently contribute to improving the fuel efficiency of a vehicle by transmitting or receiving sufficient torque and remarkably reducing drag in a clutch device which is used in a transmission.

To achieve the objectives, a clutch device configured for a transmission of the present invention includes: a first body and a second coaxially mounted to the first body; a friction element mounted between the first body and the second body; a friction piston configured to axially press the friction element by use of hydraulic pressure; a retractable mechanism including a dog clutch, which is configured to restrict rotation between the first body and the second body, and repeatedly engaging and disengaging the dog clutch by repeatedly applying pressure in axial direction thereof; and an operation piston configured to provide pressure to the retractable mechanism in an axial direction of the retractable mechanism.

The retractable mechanism may include: a first dog gear formed on an external surface of the first body; a dog housing restricted in rotation and axial movement by the second body; a dog ring slidably mounted in the dog housing and having a second dog gear on an internal surface to form the dog clutch by engaging with the first dog gear; a return spring mounted to apply an elastic force to the dog ring in a direction opposite in a direction of the pressure applied by the operation piston; and a switch ring slidably mounted in the dog housing and moving the dog ring using the pressure applied by the operation piston so that the dog ring is rotated in a direction with respect to the dog housing when the dog ring comes out of the dog housing.

The first dog gear of the first body and the second dog gear of the dog ring are formed such that surfaces that axially surface each other may be inclined surfaces that are parallel with each other.

Dog ring protrusions that are inserted into the dog housing and are guided to axially slide may be formed on an external surface of the dog ring; and holding grooves that receive the dog ring protrusions to keep the second dog gear of the dog ring engaged with the first dog gear of the first body, and release grooves that guide the inserted dog ring protrusions to freely axially move may be alternately formed on an internal surface of the dog housing in a circumferential direction thereof.

First separation walls between the holding grooves and the release grooves of the dog housing and the dog ring protrusions may be formed such that surfaces that axially surface each other are inclined surfaces that are in parallel with each other.

The switch ring may have switching portions having inclined surfaces that are parallel with the inclined surfaces of the dog ring protrusions; and the inclined surfaces of the switching portion may extend from positions corresponding to middle portions of the release grooves to positions corresponding to middle portion of the first separation walls.

A dog holding gear which is configured to be engaged with the first dog gear when the second dog gear of the dog ring is disengaged from the first dog gear may be integrally formed on an internal surface of the switch ring.

A dog holding ring having the dog holding gear which is slidably inserted into the dog housing and is configured to be engaged with the first dog gear when the second dog gear of the dog ring is disengaged from the first dog gear may be further mounted between the switch ring and the operation piston.

The operation piston may be coaxially mounted outside the friction piston, and the friction piston and the operation piston may be mounted to receive together hydraulic pressure of a same pressure chamber.

The operation piston may be coaxially mounted outside the friction piston and a second separation wall may be disposed between the friction piston and the operation piston so that hydraulic pressure which is supplied to the friction piston and hydraulic pressure which is supplied to the operation piston are configured to be independently controlled.

The friction element may be a disc set formed by alternately disposing several discs and plates.

The friction element may be a conical friction clutch having a conical friction surface.

Furthermore, to achieve the objectives of the present invention, a clutch device configured for a transmission includes: a first body and a second body coaxially disposed outside of the first body; a friction element configured to generate friction between the first body and the second body; a friction piston configured to increase friction of the friction piston by applying pressure to the friction element; and a restriction maintainer configured to restrict relative rotation of the first body and the second body even if pressure applied to the friction element by the friction piston is removed.

The restriction maintainer may include: a retractable mechanism including the dog clutch, which is configured to restrict relative rotation of the first body and the second body, and repeatedly engaging and disengaging the dog clutch by repeatedly applying pressure in axial direction thereof; and an operation piston configured to provide pressure to the retractable mechanism in an axial direction of the retractable mechanism.

The retractable mechanism may include: a first dog gear formed on an external surface of the first body; a dog ring configured to axially slide in the second body and having a second dog gear on an internal surface to form the dog clutch by engaging with the first dog gear; a return spring mounted to apply an elastic force to the dog ring in a direction opposite in a direction of the pressure applied by the operation piston; and a switching mechanism configured for switching a state in which the second dog gear of the dog ring is engaged with the first dog gear even though pressure which is repeatedly applied from the operation piston is removed, and a state in which the second dog gear is disengaged from the first dog gear when the pressure from the operation piston is removed.

The switching mechanism may include: dog ring protrusions formed to protrude from an external surface of the dog ring so that axial sliding thereof is guided by the second body; release grooves formed on the internal surface of the second body to guide axial sliding of the dog ring protrusions; holding grooves alternately formed with the release grooves on the second body so that the second dog gear keeps engaged with the first dog gear, by receiving the dog ring protrusions when elasticity of the return spring is greater than pressure of the operation piston; inclined surfaces formed to be inclined with respect to an axial direction and to be parallel with each other at portions where end portions of first separation walls, which are formed between the release grooves and the holding grooves, and the dog ring protrusions axially face each other; and a switch ring inserted into the release grooves of the second body to axially slide, being able to move the dog ring toward the return spring by pushing the dog ring protrusions using the pressure provided by the operation piston, and having inclined surfaces being parallel with the inclined surfaces of the dog ring protrusions at portions being in contact with the dog ring protrusions.

A dog holding gear which is configured to be engaged with the first dog gear when the second dog gear of the dog ring is disengaged from the first dog gear may be integrally formed on an internal surface of the switch ring.

A dog holding ring having the dog holding gear which is slidably inserted into the dog housing and is configured to be engaged with the first dog gear when the second dog gear of the dog ring is disengaged from the first dog gear may be further mounted between the switch ring and the operation piston.

The operation piston may be coaxially mounted outside the friction piston, and the friction piston and the operation piston may be mounted to receive together hydraulic pressure of a same pressure chamber.

The operation piston may be coaxially mounted outside the friction piston and a second separation wall may be disposed between the friction piston and the operation piston so that hydraulic pressure which is supplied to the friction piston and hydraulic pressure which is supplied to the operation piston are configured to be independently controlled.

According to various exemplary embodiments of the present invention, it is possible to improve the power transmission efficiency of a transmission to consequently contribute to improving the fuel efficiency of a vehicle by transmitting or receiving sufficient torque and remarkably reducing drag in a clutch device which is used in a transmission.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 7 is a view in which both of a disc set and the dog clutch have been disengaged;

FIG. 8 is a view in which a friction piston is moved and makes engagement of a friction element;

FIG. 9 is a view in which the dog ring is moved by an operation piston and second inclined surfaces of a second dog gear meet first inclined surfaces of a first dog gear;

FIG. 10 is a view in which the dog ring comes out of the dog housing and engaged with the switch ring;

FIG. 11 is a view showing the state of main portions seen in the direction an in the state of FIG. 10;

FIG. 12 is a view 3-dimensionally showing the state of FIG. 11;

FIG. 13 is a view in which the dog ring is being engaged in the dog housing;

FIG. 14 is a view showing the state of FIG. 13 in the direction A;

FIG. 15 is a view 3-dimensionally showing the engaged state of the dog clutch; and FIG. 16 is a view showing the state of FIG. 15 in the direction A;

FIG. 17 is a view in which the switch ring presses the dog ring toward a return spring;

FIG. 18 is a view showing the state of FIG. 17 in the direction A;

FIG. 19 is a view in which the dog ring comes out of the dog housing;

FIG. 20 is a view showing the state of FIG. 19 in the direction A;

FIG. 21 is a view in which the dog ring is being disengaged from the dog housing;

FIG. 22 is a view showing the state of FIG. 21 in the direction A;

FIG. 23 is a view showing the disengaged state of the dog clutch; and

FIG. 24 is a view showing the state of FIG. 23 in the direction A;

Figure 1:
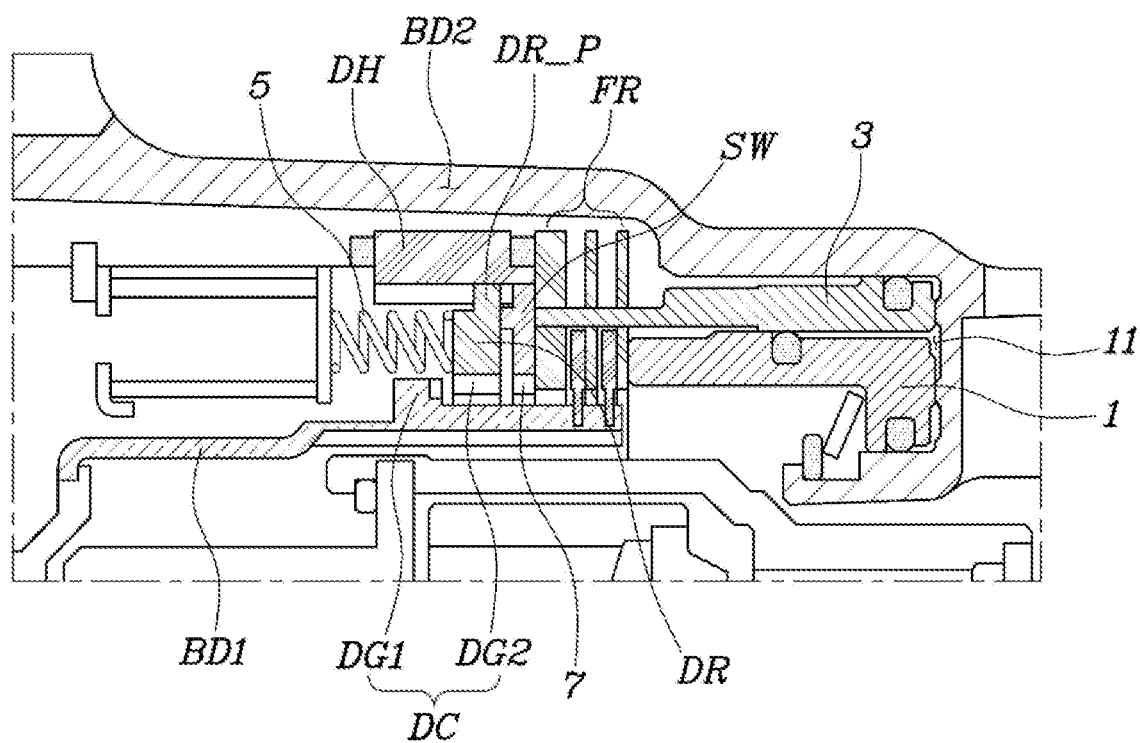
FIG. 1 is a cross-sectional view showing various exemplary embodiments of a clutch device configured for a transmission according to various exemplary embodiments of the present invention.
Figure 2:
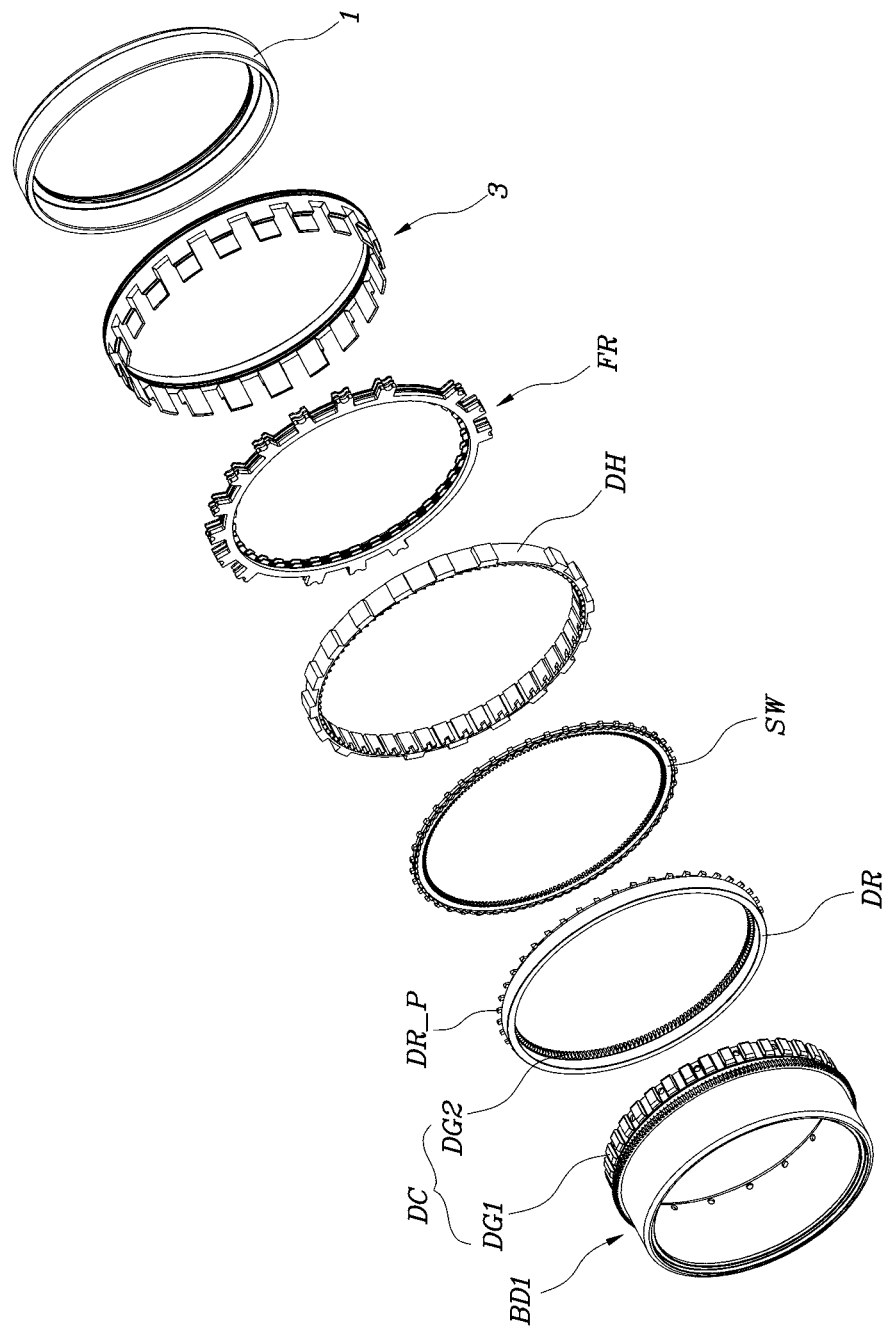
FIG. 2 is an exploded perspective view of main portions shown in FIG. 1.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinbelow, various exemplary embodiments of the present invention will be described in detail with reference to the accompanying drawings. Throughout the drawings, the same reference numerals will refer to the same or like parts.

Referring to FIGS. 1 to 6, a first exemplary embodiment of a clutch device configured for a transmission of the present invention includes: a first body BD1 and a second BD2 coaxially mounted; a friction element FR mounted between the first body BD1 and the second body BD2; a friction piston 1 to be configured to axially press the friction element FR using hydraulic pressure; a retractable mechanism including a dog clutch DC, which can restrict rotation between the first body BD1 and the second body BD2, and repeatedly engaging and disengaging the dog clutch DC by repeatedly axially applying pressure; and an operation piston 3 to be configured to provide pressure to the retractable mechanism in an axial direction of the retractable mechanism.

That is, in various aspects of the present invention, relative rotation is suppressed by generating friction between the first body BD1 and the second body BD2 through the friction element FR which is operated by hydraulic pressure, the suppressed relative rotation is maintained by engaging the dog clutch DC, and the dog clutch DC is alternately engaged and disengaged by pressure axially repeatedly applied by the retractable mechanism.

Accordingly, when the friction element FR is a disc set including several discs and plates, the number of the discs and plates is sufficient as long as they can overcome the relative rotation of the first body BD1 and the second body BD2 at the early engagement stage of the clutch device, and the dog clutch DC can replace the function of stably keeping a continuous engagement state, it is possible to reduce the number of the discs and plates, as compared with the related art, which remarkably decrease drag in the disc set. Accordingly, the power transmission efficiency of a transmission is improved, and consequently, the fuel efficiency of a vehicle may be improved.

The first body BD1 and the second body BD2 are substantially objects which may restrict and enable rotation with respect to each other. In FIG. 1, the first body BD1 is a hub and the second body BD2 is a transmission housing, and substantially, the clutch device between the first body BD1 and the second body BD2 performs the function of an existing brake.

Obviously, when the second body BD2 is not a transmission housing, but a rotor, the clutch device may be configured to perform the function of an existing clutch.

For reference, the term 'axial' means the direction which is parallel with the rotation axis of the first body BD1 and the second body BD2.

In the exemplary embodiment, the retractable mechanism includes: a first dog gear DG1 formed on the external surface of the first body BD1; a dog housing DH restricted in rotation and axial movement by the second body BD2; a dog ring DR slidably mounted in the dog housing DH and having a second dog gear DG2 on the internal surface to form the dog clutch CD by engaging with the first dog gear DG1; a return spring 5 mounted to apply an elastic force to the dog ring DR in the opposite direction to pressure applied by the operation piston 3; and a switch ring SW slidably mounted in the dog housing DH and moving the dog ring DR using the pressure applied by the operation piston 3 such that the dog ring DR is rotated in one direction with respect to the dog housing DH when the dog ring DR comes out of the dog housing DH.

That is, the dog clutch DC substantially includes the first dog gear DG1 formed on the external surface of the first body BD1 and the second dog gear DG2 formed on the dog ring DR.

For reference, as described below, the dog housing DH may be integrated with the second body BD2 rather than being separately provided.

Figure 3:
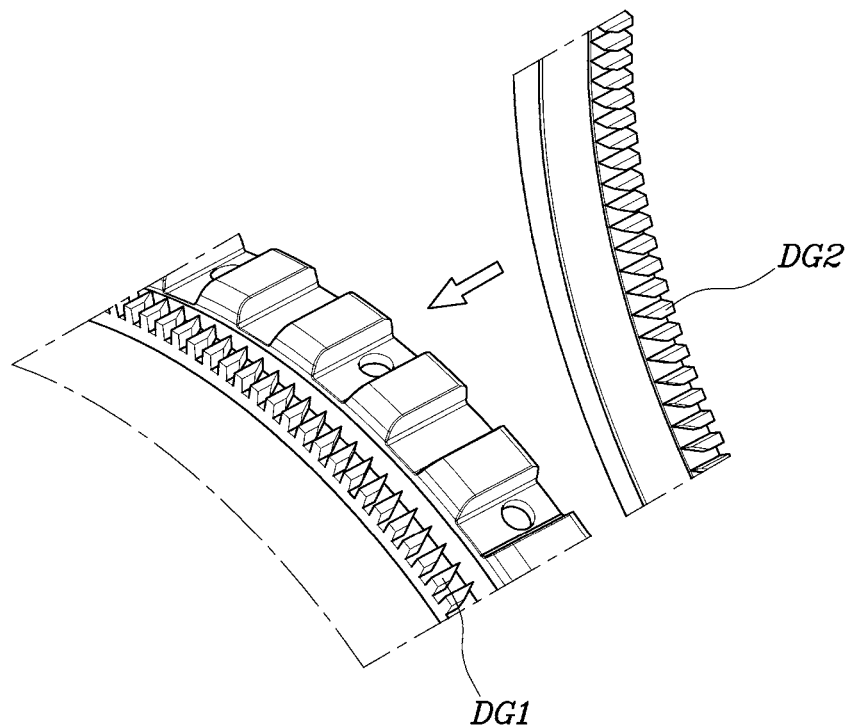
FIG. 3 is a view showing a first dog gear and a second dog gear shown in FIG. 2.
Figure 4:
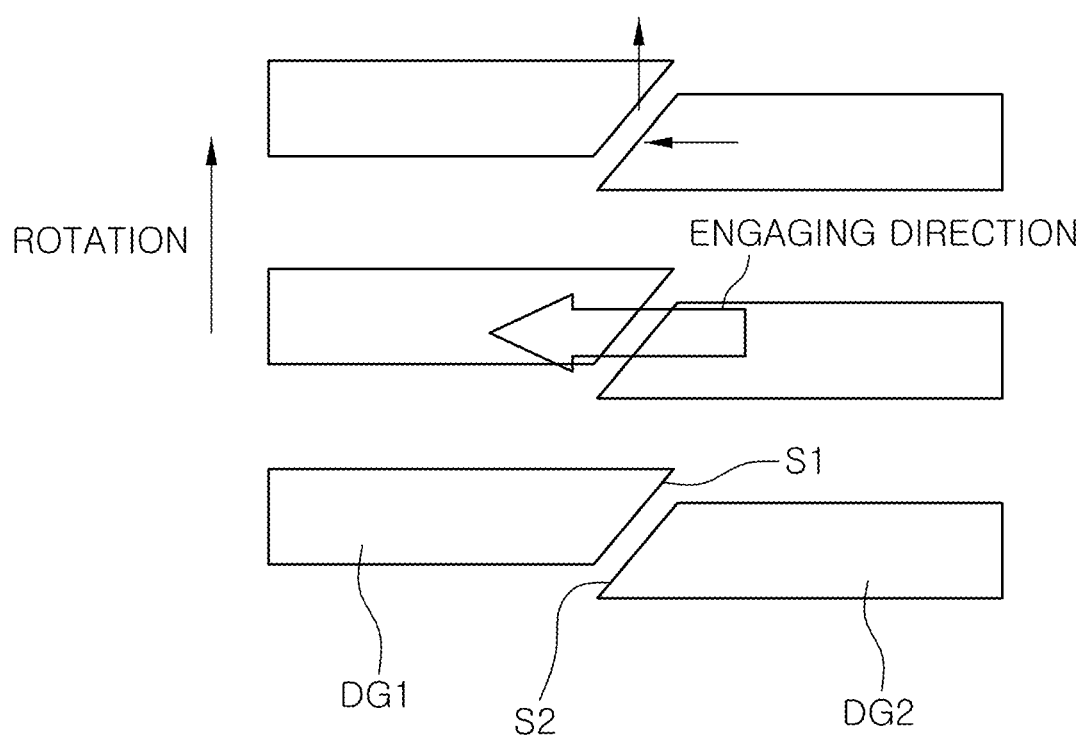
FIG. 4 is a view showing engagement of the first dog gear and the second dog gear shown in FIG. 3.
Figure 5:
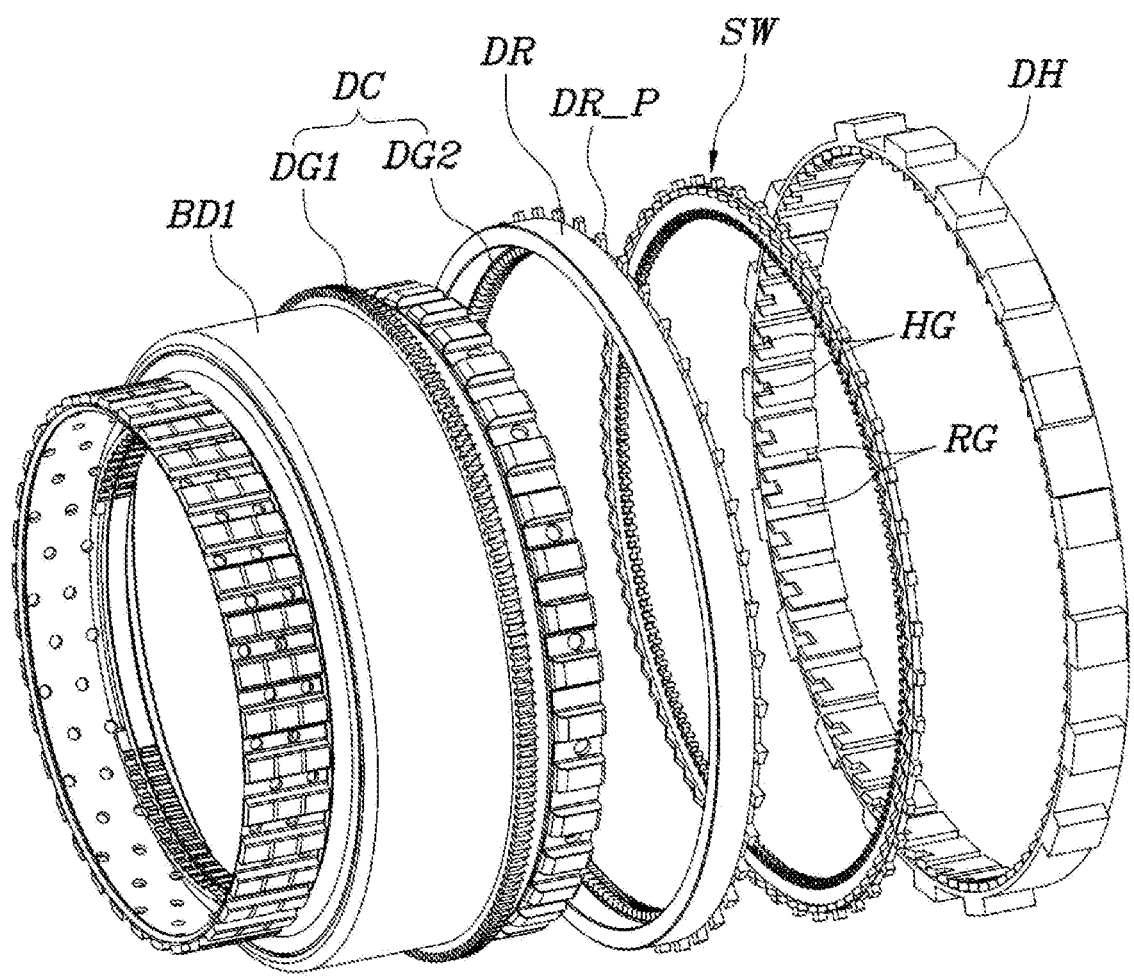
FIG. 5 is a view showing a first body, a dog ring, a switch ring, and a dog housing shown in FIG. 2.
Figure 6:
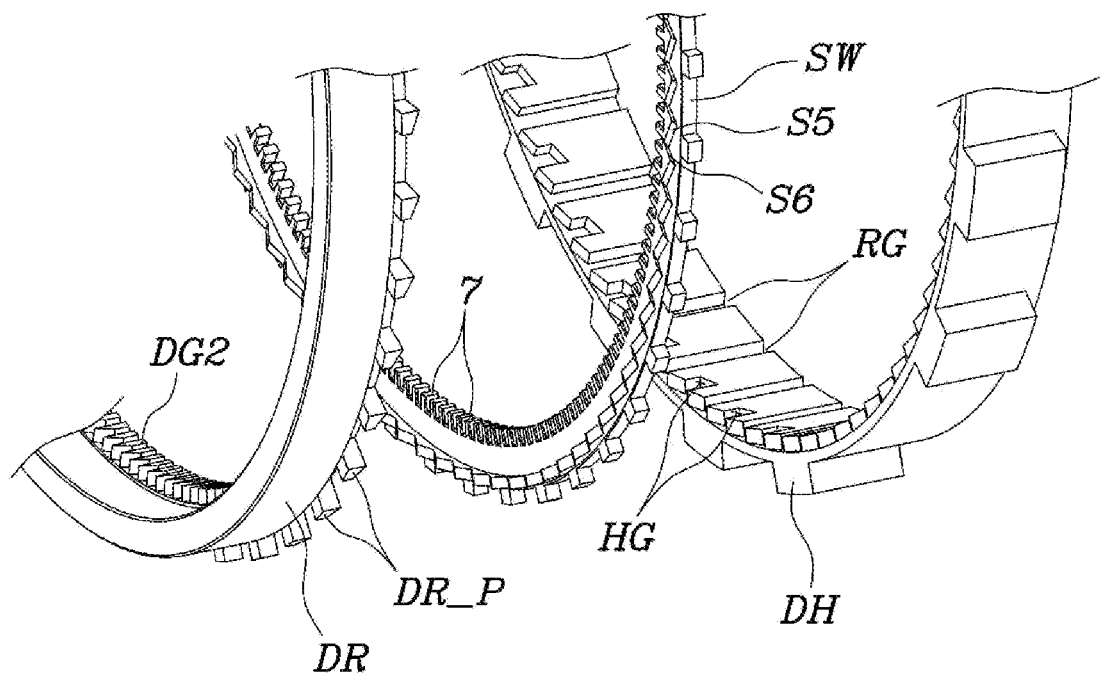
FIG. 6 is an enlarged view showing in detail a portion of FIG. 5.

The first dog gear DG1 of the first body BD1 and the second dog gear DG2 of the dog ring DR are formed such that the surfaces that axially face each other are inclined surfaces that are parallel with each other, as shown in FIG. 3 and FIG. 4.

To discriminate the inclined surfaces, the inclined surface of the first dog gear DG1 is referred to as a first inclined surface S1 and the inclined surface of the second dog gear DG2 is referred to as a second inclined surface S2.

Accordingly, when the second dog gear DG2 of the dog ring DR is pressed toward the first dog gear DG1, the first inclined surface S1 and the second inclined surface S2 slide on each other, they may be easily engaged through slight relative rotation without stopping, whereby it is possible to always secure smooth and stable engagement of the dog clutch DC.

The dog ring DR is configured to axially slide through the dog housing DH with respect to the second body BD2 and the dog housing DH is fixed to the second body BD2 to be configured to guide straight sliding of the dog ring DR.

Accordingly, since the second body BD2 is a transmission housing, the second dog gear DG2 cannot rotate in the configuration of FIG. 1, so, in FIG. 4, only the hub which is the first body BD1 is shown as being rotated by the first inclined surface S1 and the second inclined surface S2 of the first dog gear DG1 and the second dog gear DG2.

Dog ring protrusions DR_P that are inserted into the dog housing DH and are guided to axially slide are formed on the external surface of the dog ring DR.

Holding grooves HG that receive the dog ring protrusions DR_P to keep the second dog gear DG2 of the dog ring DR engaged with the first dog gear DG1 of the first body BD1, and release grooves RG that guide the inserted dog ring protrusions DR_P freely axially moving are circumferentially alternately formed on the internal surface of the dog housing DH.

That is, when the dog ring protrusions DR_P come out of the release grooves RG, they further move toward the operation piston 3, as compared with when they are inserted into the holding grooves HG, so that the second dog gear DG2 may be separated from the first dog gear DG1. On the other hand, when the dog ring protrusions DR_P are inserted into the holding grooves HG, the second dog gear DG2 is engaged with the first dog gear DG1.

First separation walls W1 between the holding grooves HG and the release grooves RG of the dog housing DH and the dog ring protrusions DR_P are formed such that surfaces that axially face each other are inclined surface that are in parallel with each other.

For reference, to discriminate the inclined surfaces of the first separation wall W1 and the dog ring protrusions DR_P from other inclined surfaces, the inclined surfaces of the first separation wall W1 are referred to as third inclined surfaces S3 and the inclined surfaces of the dog ring protrusion DR_P are referred to as fourth inclined surfaces S4.

The third inclined surfaces S3 and the fourth inclined surfaces S4 may be seen in FIG. 6, FIG. 7, FIG. 8, FIG. 9, FIG. 10, and FIG. 11.

The dog ring DR moves toward the return spring 5 when the pressure provided by the operation piston 3 is greater than the elasticity of the return spring 5, and it moves toward the operation piston 3 when the pressure provided by the operation piston 3 is smaller than the elasticity.

When the dog ring DR is moved toward the operation piston 3 by the elasticity of the return spring 5, the fourth inclined surfaces S4 of the dog ring protrusions DR_P are guided by the third inclined surfaces S3 of the first separation wall W1 and rotate the dog ring DR, whereby the dog ring protrusions DR_P are alternately inserted into the holding grooves HG and the release grooves RG.

That is, every time the operation piston 3 pushes the dog ring DR toward the return spring 5 and then releases the dog ring DR, the dog ring protrusions DR_P of the dog ring DR are repeatedly alternately inserted into the holding grooves HG and the release grooves RG of the dog housing DH.

This operation needs help of the switch ring SW to be described hereafter.

The switch ring SW has switching portions having inclined surfaces that are parallel with the fourth inclined surfaces S4 of the dog ring protrusions DR_P.

The inclined surfaces of the switching portions are referred to as fifth inclined surfaces to be discriminated from other inclined surfaces.

In the exemplary embodiment, the fifth inclined surfaces S5 of the switching portions extend from positions corresponding to the middle portions of the release grooves RG to positions corresponding to the middle portion of the first separation walls W1. The switch portions may be formed, as shown in FIG. 11, by repeatedly connecting the fifth inclined surfaces S5 through sixth inclined surfaces S6 having almost axially symmetric shape to the fifth inclined surfaces S5.

When the operation piston 3 pushes the dog ring DR toward the return spring 5, the switch ring SW transmits the operation force to the dog ring DR, and when the dog ring protrusions DR_P of the dog ring DR are separated out of the holding grooves HG or the release grooves RG of the dog housing DH, the switch ring SW determines the rotation direction of the dog ring DR.

Figure 11:
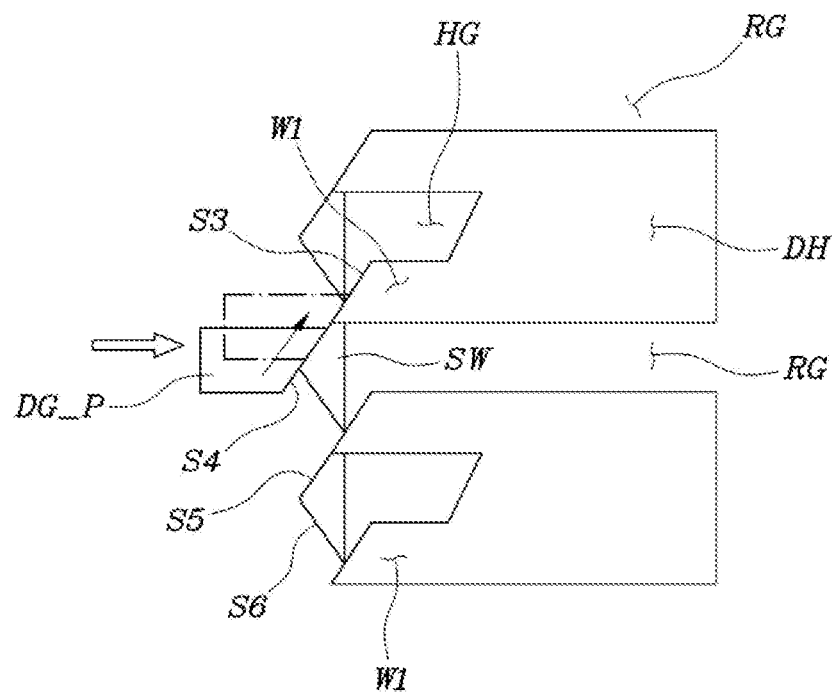
Figure 12:
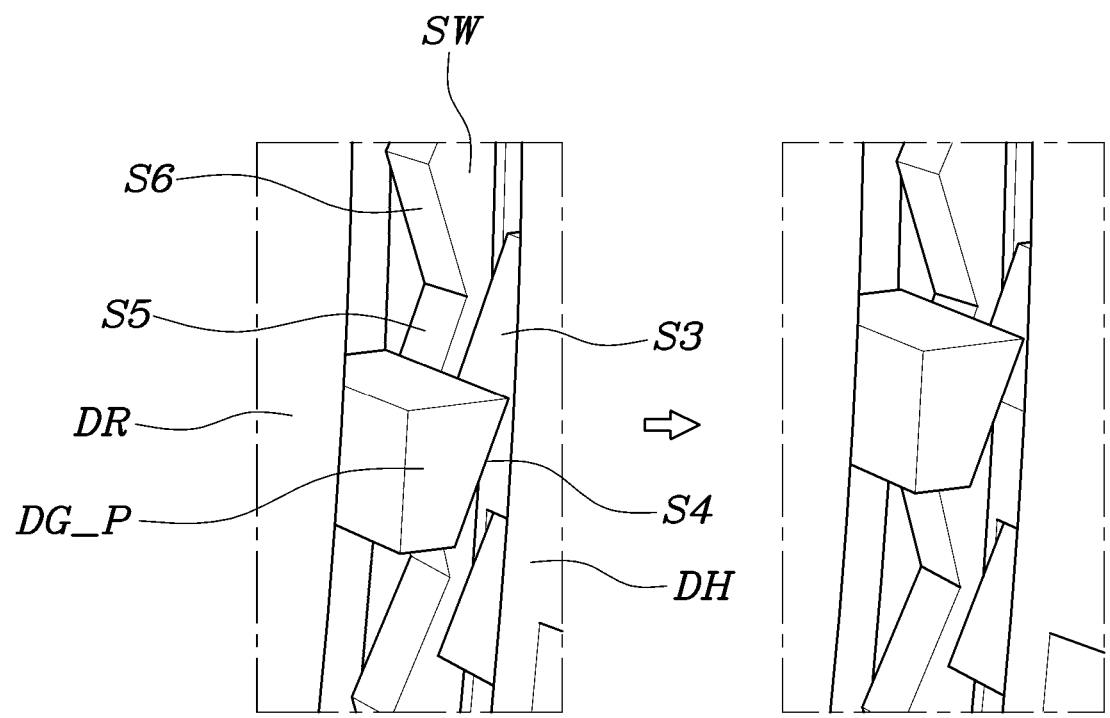
Figure 13:
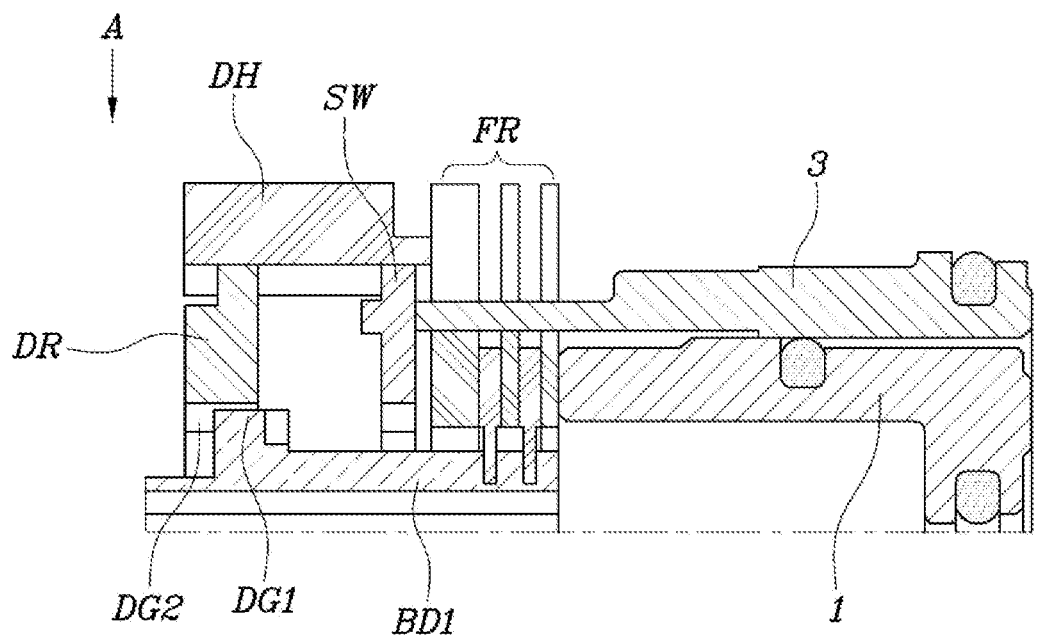

That is, when the dog ring protrusions DR_P are separated from the dog housing DH, the fifth inclined surfaces S5 of the switch ring SW guide the dog ring protrusions DR_P upward in FIG. 11 such that the front end portions of the fourth inclined surfaces S4 are accommodated in grooves formed at the joints of the fifth inclined surfaces S5 and the sixth inclined surfaces S6. Furthermore, when the pressure by the operation piston 3 decreases and the dog ring protrusions DR_P move toward the dog housing DH, the fourth inclined surfaces S4 of the dog ring protrusions DR_P are guided in surface-contact with the third inclined surfaces S3 of the first separation wall W1.

In the exemplary embodiment of the present invention, a dog holding gear 7 which may be engaged with the first dog gear DG1 when the second dog gear DG2 of the dog ring DR is disengaged from the first dog gear DG1 is integrally formed on the internal surface of the switch ring SW, whereby it is possible to continuously maintain a structure that mechanically restrict relative rotation of the first body BD1 and the second body BD2 through the dog housing DH.

Figure 25:
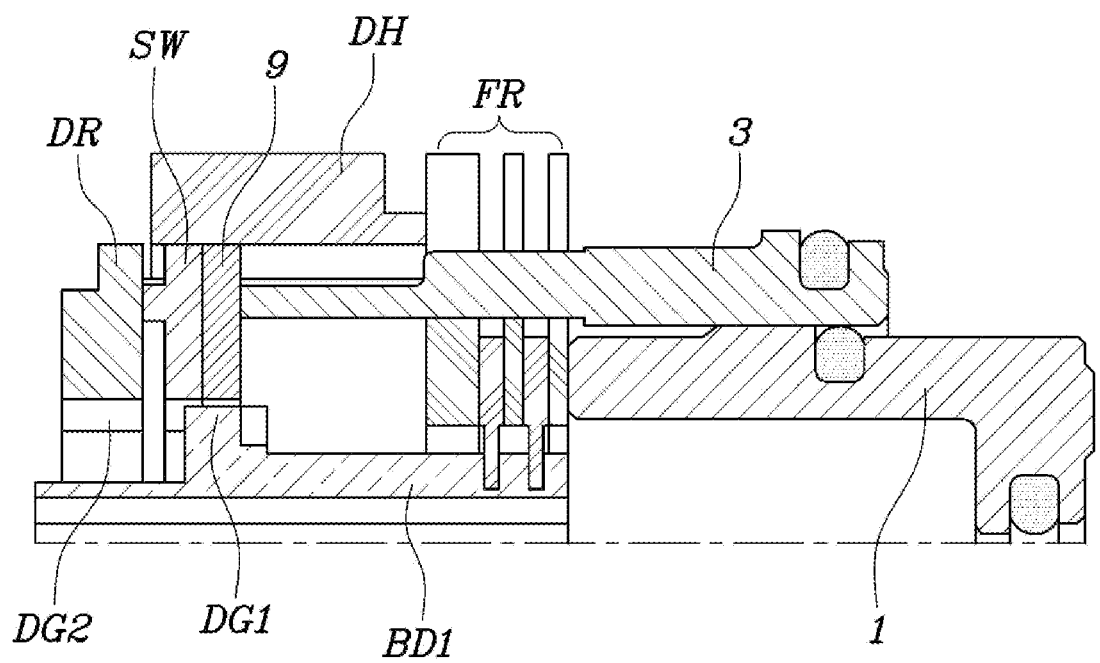
FIG. 25 is a view showing various exemplary embodiments of the present invention.

Meanwhile, as in the second exemplary embodiment shown in FIG. 25, a dog holding ring 9 having the dog holding gear 7 which is slidably inserted into the dog housing DH and may be engaged with the first dog gear DG1 when the second dog gear DG2 of the dog ring DR is disengaged from the first dog gear DG1 may be further mounted between the switch ring SW and the operation piston 3.

That is, the switch ring SW guides movement of the dog ring protrusions DR_P of the dog ring DR using the fifth inclined surfaces S5 and the sixth inclined surfaces S6, and also continuously mechanically restrict the relative rotation between the first body BD1 and the second body BD2 even though the dog ring DR cannot restrict the relative rotation by having the integrated dog holding gear 7 in the first exemplary embodiment. However, in the second exemplary embodiment, a dog holding ring 9 is separately provided to continuously restrict the relative rotation of the first body BD1 and the second body BD2 even though the second dog gear DG2 is disengaged from the first dog gear DG1.

In the instant case, the dog holding ring 9 transmits the pressure by the operation piston 3 to the switch ring SW and the switch ring SW transmits the pressure to the dog ring DR.

In the first exemplary embodiment shown in FIG. 1, the operation piston 3 is coaxially mounted outside the friction piston 1, and the friction piston 1 and the operation piston 3 are mounted to receive together hydraulic pressure of the same pressure chamber 11.

Accordingly, when the hydraulic pressure of the pressure chamber 11 is operated, the friction piston 1 and the operation piston 3 are operated together.

Figure 26:
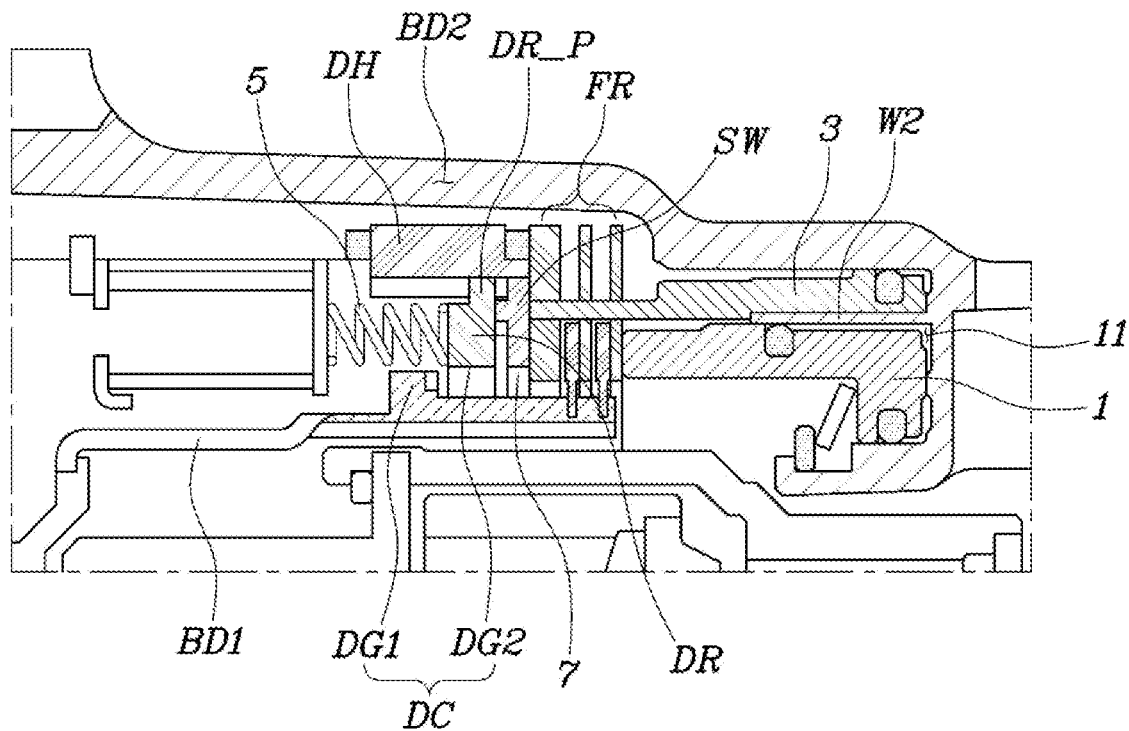
FIG. 26 is a view showing various exemplary embodiments of the present invention.

Meanwhile, in the third exemplary embodiment shown in FIG. 26, the operation piston 3 is coaxially mounted outside the friction piston 1 and a second separation wall W2 is mounted between the friction piston 1 and the operation piston 3 so that the hydraulic pressure which is supplied to the friction piston 1 and the hydraulic pressure which is supplied to the operation piston 3 may be independently controlled.

Accordingly, the third exemplary embodiment can have an advantage that it is possible to more smoothly and precisely control the clutch device by separately independently controlling the hydraulic pressure which is supplied to the friction piston 1 and the hydraulic pressure which is supplied to the operation piston 3.

Figure 27:
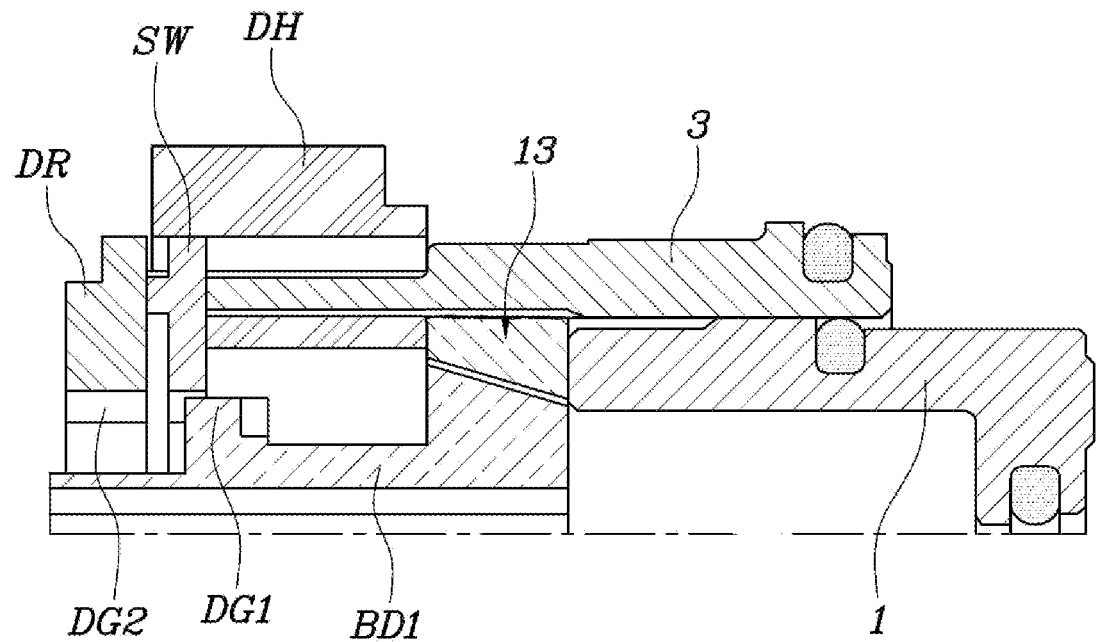
FIG. 27 is a view showing various exemplary embodiments of the present invention.

Furthermore, although the friction element FR is a disc set formed by alternately disposing several discs and plates in the first exemplary embodiment shown in FIG. 1, unlike from the first exemplary embodiment, as shown in the fourth exemplary embodiment shown in FIG. 27, the friction element FR may be a conical friction clutch 13 having conical a friction surface.

Obviously, all kinds of mechanisms that can continuously change the friction between the first body BD1 and the second body BD2 by axially applying pressure may be used as the friction element FR.

Hereafter, on the basis of the first exemplary embodiment, a process of engaging the clutch device of the present invention is described with respect to FIGS. 7 to 16 and a process of disengaging the clutch device of the present invention is described with reference to FIGS. 17 to 24.

Figure 7:
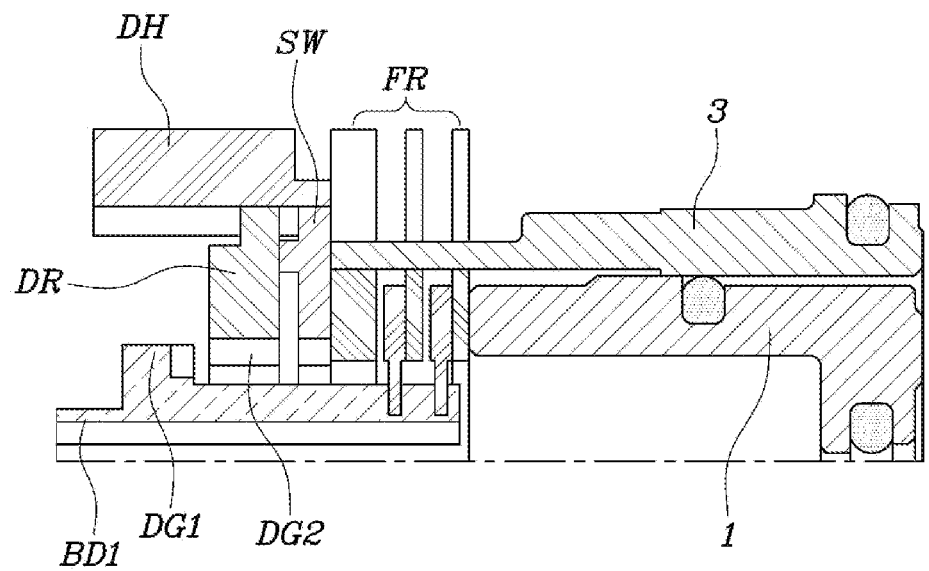
FIGS. 7 to 16 are views sequentially showing the engagement process of a dog clutch.

FIG. 7 is a view in which both of the disc set, which is the friction element FR, and the dog clutch DC have been disengaged.

In the Present State, the Dog Ring Protrusions DR_P of the Dog Ring DR can Axially Slide in the Release Grooves RF of the Dog Housing DH.

Figure 8:
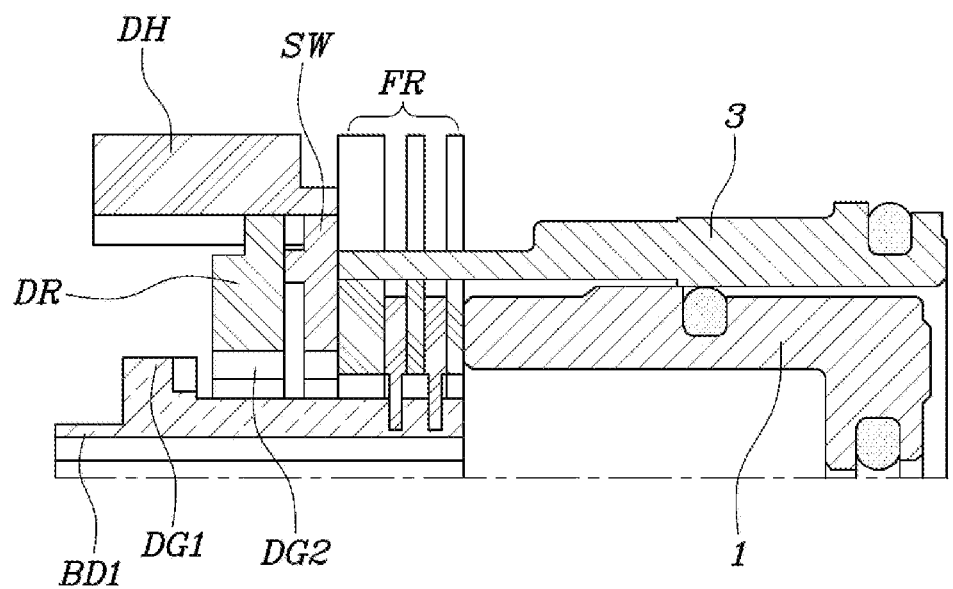

When hydraulic pressure is supplied to the friction piston 1 and the operation piston 3 in the instant state, the friction piston 1 generates friction by engaging the friction element FR while moving left in the figures, as in FIG. 8, suppressing relative rotation of the first body BD1 and the second body BD2.

Figure 9:
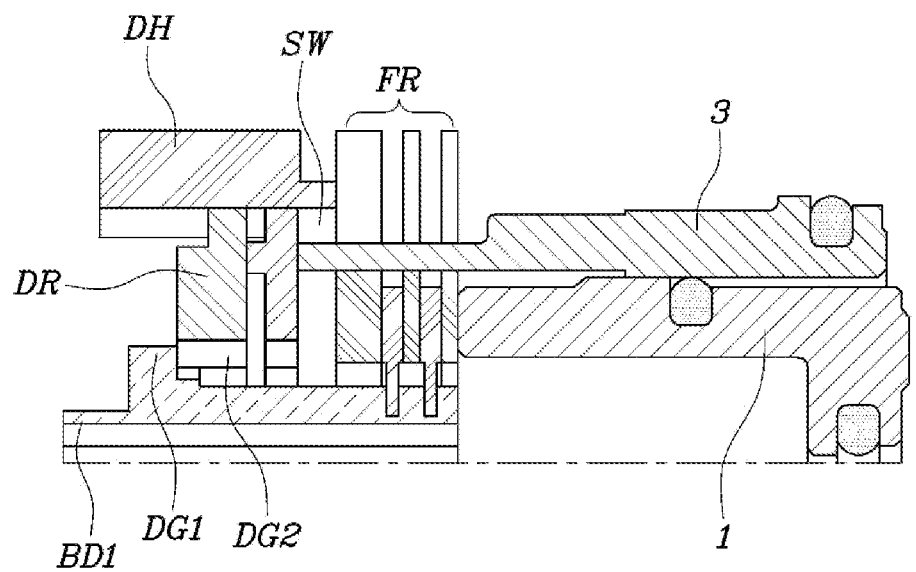

The operation piston 3 moves the dog ring DR left in the figures toward the return spring 5 through the switch ring SW such that the second inclined surfaces S2 of the second dog gear DG2 of the dog ring DR, as in FIG. 9, meet the first inclined surfaces S1 of the first dog gear DG1 of the first body BD1 (see FIG. 4).

Figure 10:
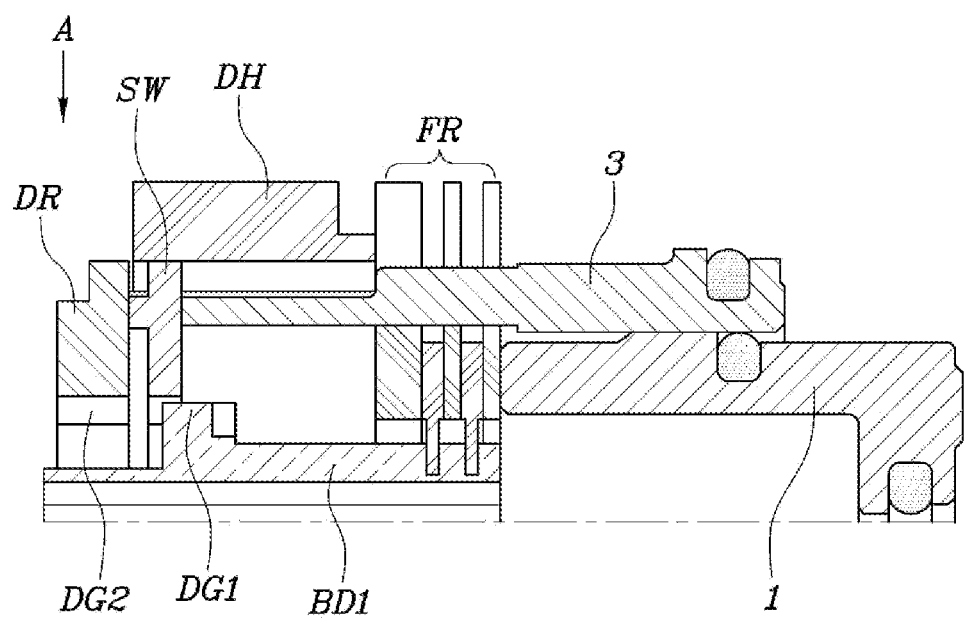

When the dog ring DR is further moved left, the second dog gear DG2 is fully engaged with the first dog gear DG1 and then completely moved beyond the first dog gear DG1 of the first body BD1, and the dog ring DR also comes out of the dog housing DH, as shown in FIG. 10.

In the present state, the dog ring protrusions DR_P are in contact with the fifth inclined surfaces S5 on the fourth inclined surfaces S4 are rotated by the elasticity of the return spring 5 right after coming out of the release grooves RG of the dog housing DH, so, as shown in FIG. 11, the front end portions of the fourth inclined surfaces S4 are accommodated in the grooves formed between the fifth inclined surfaces S5 and the sixth inclined surfaces S6 of the switch ring SW.

In the present state, the relative rotation of the first body BD1 and the second body BD2 keeps restricted by the dog holding gear 7 of the switch ring SW, as described above.

That is, when hydraulic pressure is applied to the friction piston 1 and the operation piston 3, primarily, the relative rotation of the first body BD1 and the second body BD2 is restricted by the friction element FR, and then, the second dog gear DG2 is engaged with the first dog gear DG1 and the dog clutch DC is temporarily engaged, whereby secondary restriction is achieved. This restriction state is maintained by the dog holding gear 7 of the switch ring SW even though the dog clutch is disengaged again, whereby a third restriction state is achieved, as shown in FIG. 11.

Figure 14:
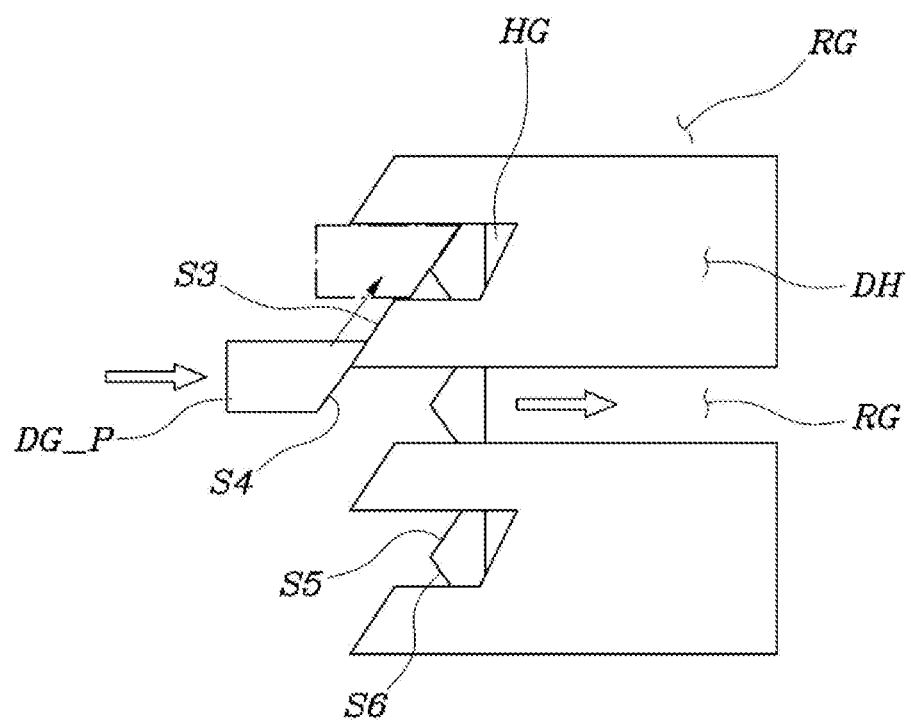
Figure 15:
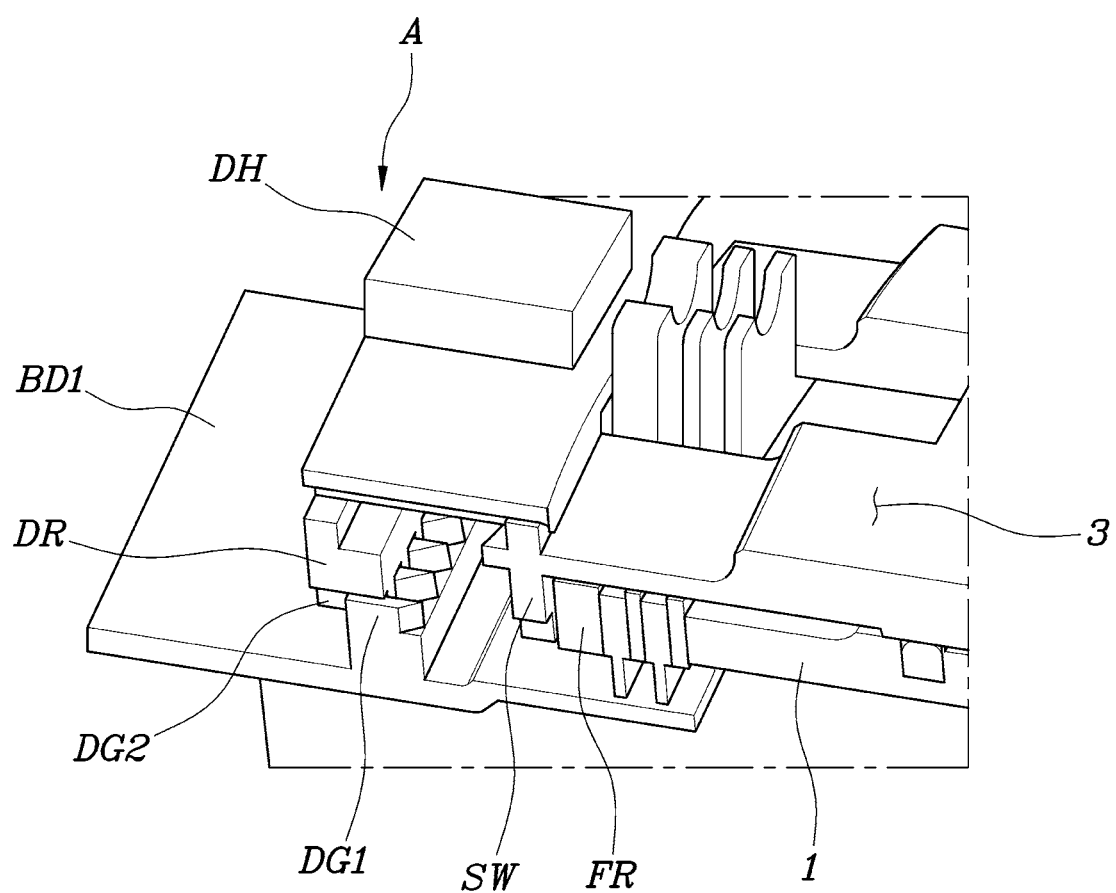
Figure 16:
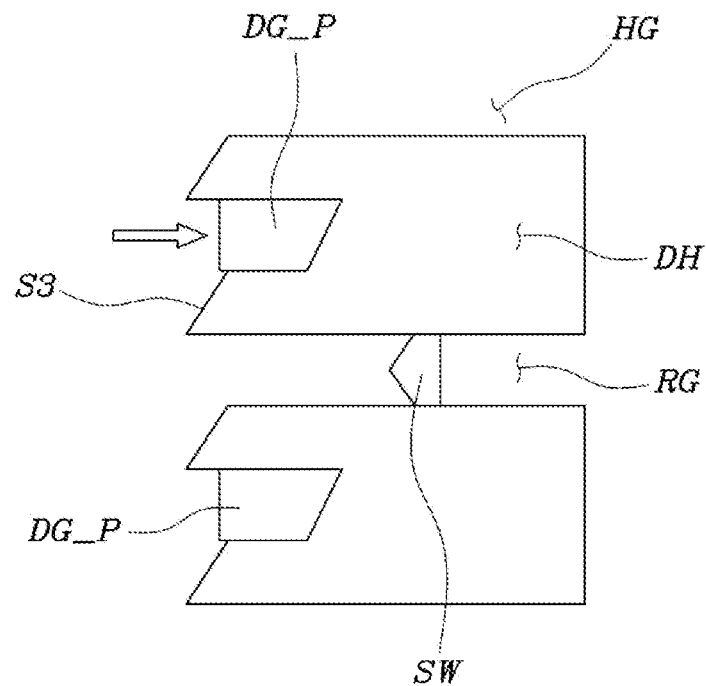

In the present state, when the hydraulic pressure applied to the operation piston 3 is removed, the fourth inclined surfaces S4 of the dog ring protrusions DR_P are moved over the third inclined surfaces S3 of the first separation wall W1 of the dog housing DH, as shown in FIG. 14, and are inserted into the holding grooves HG of the dog housing DH, as shown in FIG. 16, and in the instant state, the second dog gear DG2 is gear-meshed with the first dog gear DG1, so that the dog clutch DC is actually engaged.

In the present state, the engagement of the first body BD1 and the second body BD2 is continuously stably maintained even if hydraulic pressure is not applied to the operation piston 3 and the friction piston 1, so it is possible to reduce the energy for generating hydraulic pressure for continuously pressing the friction element RF generally, which can consequently contribute to improving the fuel efficiency of a vehicle.

The operation of disengaging the clutch device that has been engaged as described above is described with reference to FIGS. 17 to 24.

Figure 17:
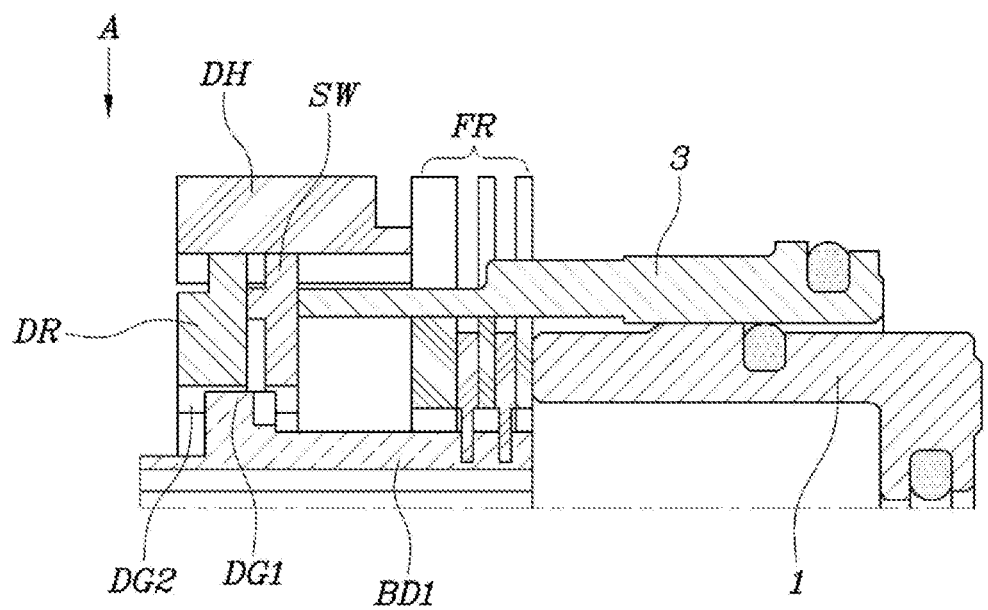
FIGS. 17 to 24 are views sequentially showing the disengagement process of the dog clutch.
Figure 18:
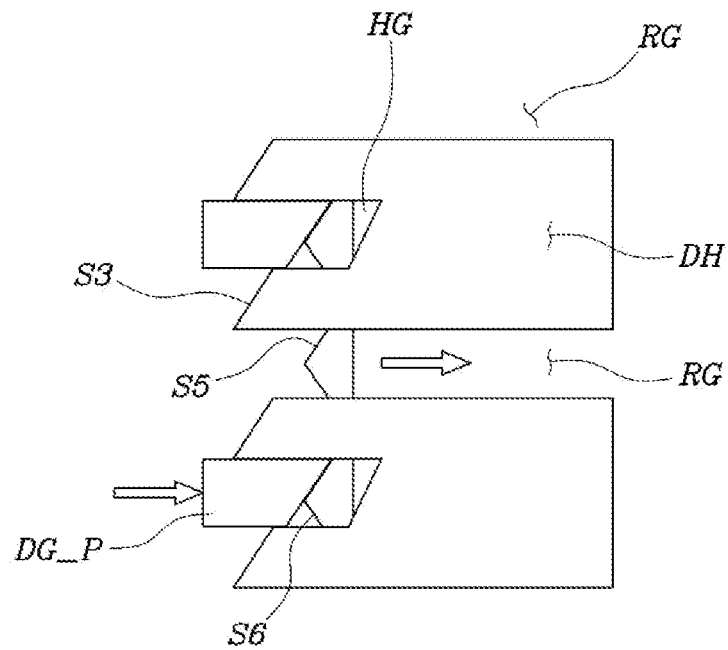
Figure 19:
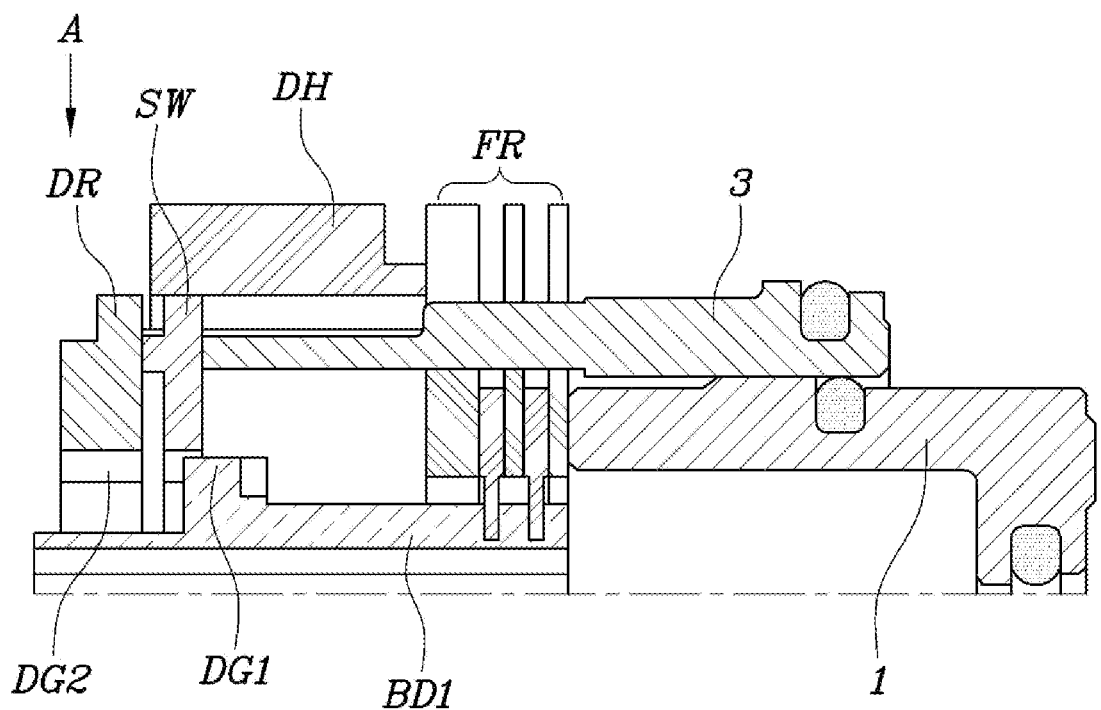

To disengage the clutch device, hydraulic pressure is applied to the operation piston 3 such that the switch ring SW presses the dog ring protrusions DR_P of the dog ring DR toward the return spring 5, as shown in FIGS. 17 and 18.

Figure 20:
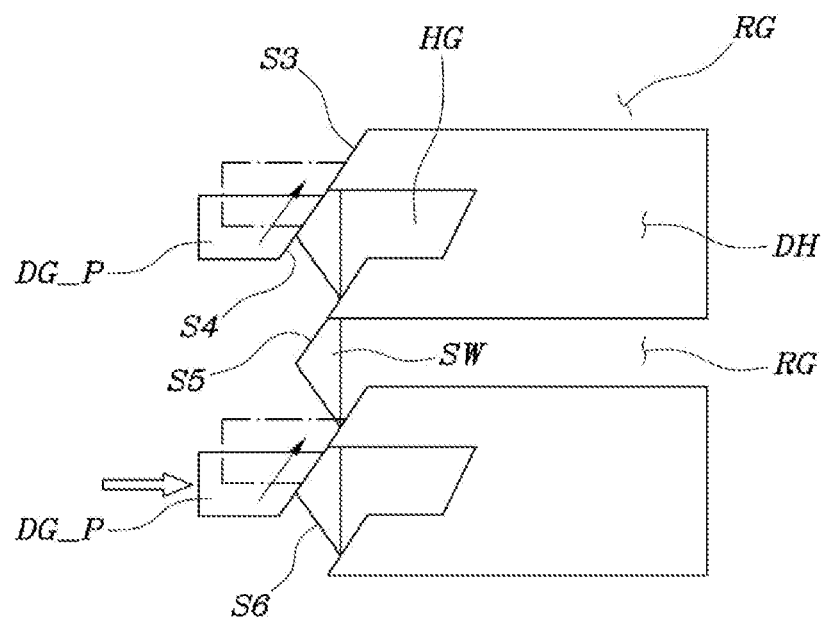
Figure 21:
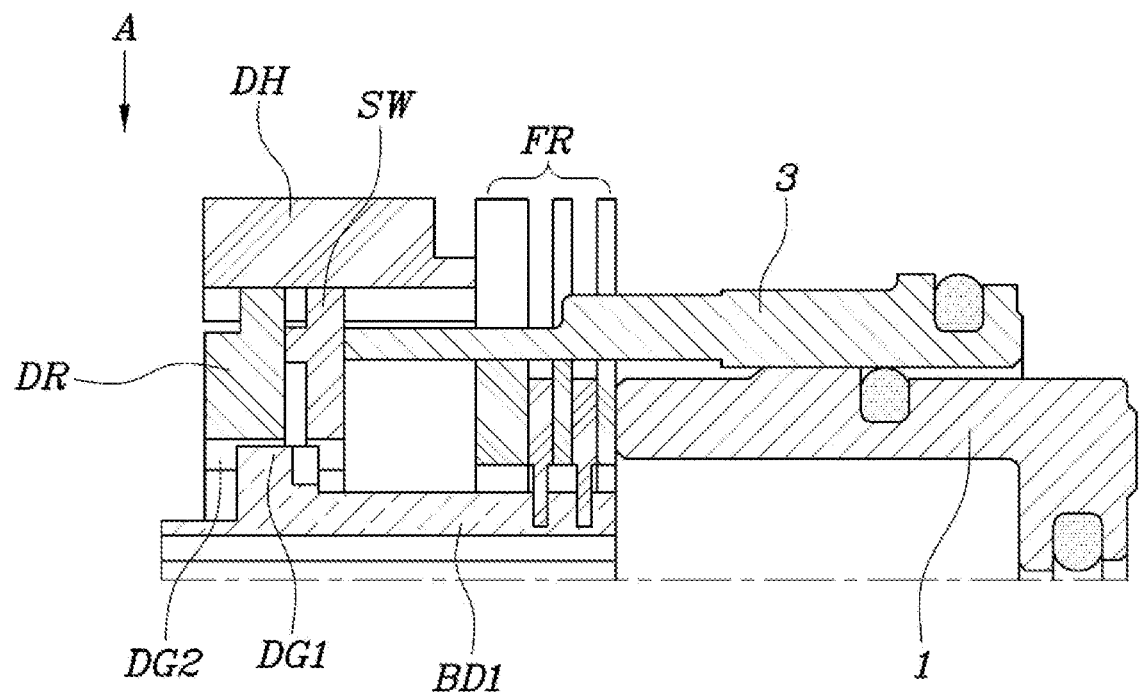

The fifth inclined surfaces S5 of the switch ring SW keep pushing the dog ring protrusions DR_P such that the dog ring protrusions DR_P come out of the holding grooves HG of the dog housing DH, and then guide the dog ring protrusions DR_P to rotate toward the release grooves RG, as shown in FIG. 20.

Figure 22:
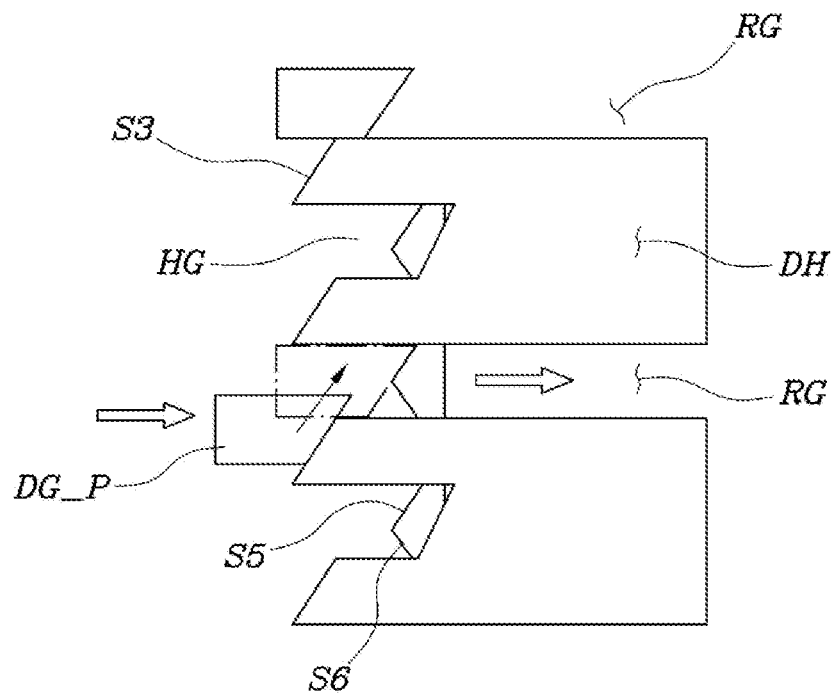
Figure 23:
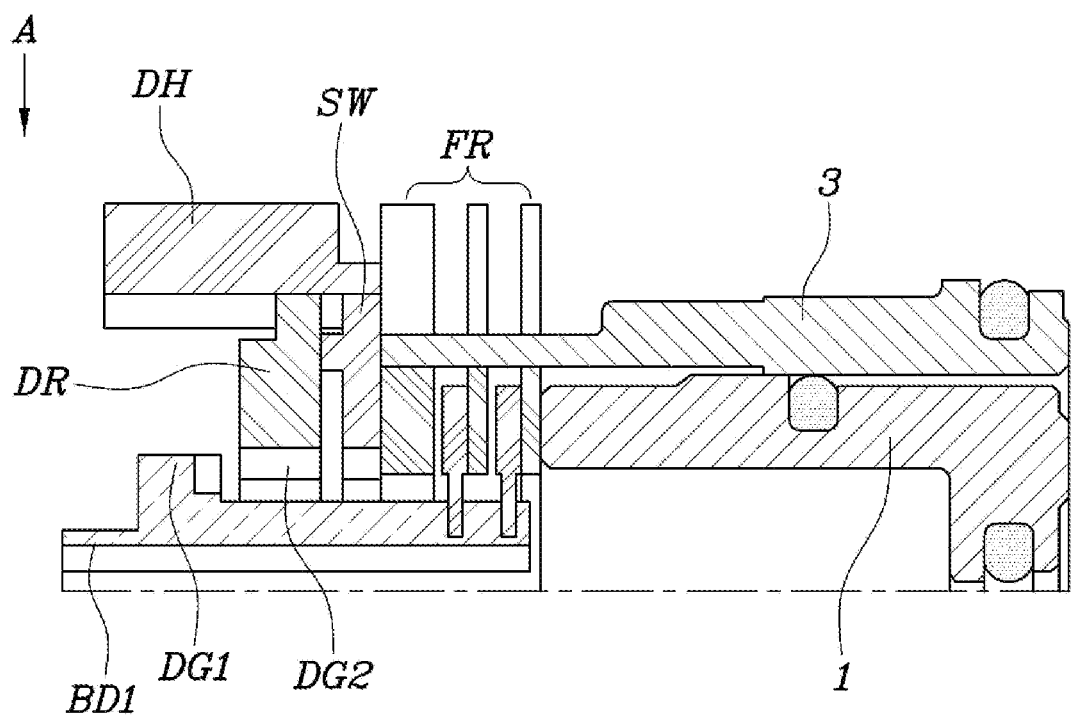
Figure 24:
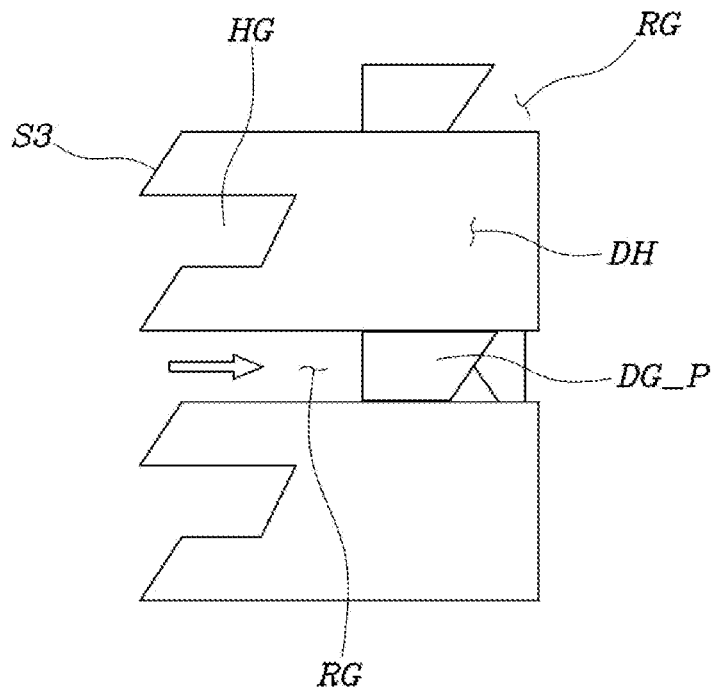

When the dog ring protrusions DR_P of the dog ring DR are inserted into the release grooves RG, the hydraulic pressure applied to the operation piston 3 is removed. Accordingly, the dog ring protrusions DR_P are slid toward the operation piston 3 over the release grooves RG by the elasticity of the return spring 5, as shown in FIGS. 22 and 24, and the second dog gear DG2 of the dog ring DR is disengaged from the first dog gear DG1 of the first body BD1, whereby the clutch device is disengaged.

Obviously, the pressure applied to the friction element FR is also removed, so that the first body BD1 and the second body BD2 are changed into the state in which the relative rotation is possible.

When the clutch device is engaged and disengaged, the operation described above is repeatedly alternately performed every time pressure is applied to and removed from the friction piston 1 and the operation piston 3, in which the engaged state of the dog clutch DC is maintained and then the disengaged state of the dog clutch DC is maintained.

On the other hand, the present invention may be expressed as follows.

That is, the clutch device configured for a transmission of the present invention may include: a first body BD1 and a second body BD2 coaxially mounted inside and outside; a friction element FR configured to generate friction between the first body BD1 and the second body BD2; a friction piston 1 provided to be configured to increase friction of the friction element FR by applying pressure to the friction element FR; and a restriction maintainer configured to restrict relative rotation of the first body BD1 and the second body BD2 even if the pressure applied to the friction element FR by the friction piston 1 is removed.

The restriction maintainer may include: a retractable mechanism forming the dog clutch DC, which can restrict relative rotation of the first body BD1 and the second body BD2, and repeatedly engaging and disengaging the dog clutch DC by repeatedly axially applying pressure; and an operation piston 3 to be configured to provide pressure to the retractable mechanism in an axial direction of the retractable mechanism.

The retractable mechanism may include: a first dog gear DG1 formed on the external surface of the first body BD1; a dog ring DR mounted to be configured to axially slide in the second body BD2 and having a second dog gear DG2 on the internal surface to form the dog clutch CD by engaging with the first dog gear DG1; a return spring 5 mounted to apply an elastic force to the dog ring DR in the opposite direction to pressure applied by the operation piston 3; and a switching mechanism configured for switching a state in which the second dog gear DG2 of the dog ring DR is engaged with the first dog gear DG1 even though pressure which is repeatedly applied from the operation piston 3 is removed, and a state in which the second dog gear DG2 is disengaged from the first dog gear DG1 when the pressure from the operation piston 3 is removed.

That is, the second body BD2 can perform the function of the dog housing DH without a separate dog housing DH, and it is possible to reduce the number of portions by forming release grooves RF, holding grooves HG, and first separation walls W1, which will be described below, on the second body BD2.

This means that the separate dog housing DH described above may be provided and the configuration for performing the functions of the present invention may be integrated with the second body BD2, depending on the shape or the structure of the second body BD2.

The switching mechanism may include: dog ring protrusions DR_P protruding from the external surface of the dog ring DR such that axial sliding thereof is guided by the second body BD2; release grooves RG formed on the internal surface of the second body BD2 to guide axial sliding of the dog ring protrusions DR_P; holding grooves HG alternately formed with the release grooves RG on the second body BD2 such that the second dog gear DG2 keeps engaged with the first dog gear DG1, by receiving the dog ring protrusions DR_P when elasticity of the return spring 5 is greater than the pressure of the operation piston 3; inclined surfaces inclined with respect to the axial direction and being parallel with each other at portions where end portions of first separation walls W1, which are formed between the release grooves RG and the holding grooves HG, and the dog ring protrusions DR_P axially face each other; and a switch ring SW inserted into the release grooves RG of the second body BD2 to axially slide, being able to move the dog ring DR toward the return spring 5 by pushing the dog ring protrusions DR_P using pressure provided by the operation piston 3, and having inclined surfaces being parallel with the inclined surfaces of the dog ring protrusions DR_P at the portions being in contact with the dog ring protrusions DR_P.

A dog holding gear 7, which may be engaged with the first dog gear DG1 when the second dog gear DG2 of the dog ring DR is disengaged from the first dog gear DG1, may be integrally formed on the internal surface of the switch ring SW.

A dog holding ring 9 having the dog holding gear 7 which is slidably inserted into the dog housing DH and may be engaged with the first dog gear DG1 when the second dog gear DG2 of the dog ring DR is disengaged from the first dog gear DG1 may be further mounted between the switch ring SW and the operation piston 3.

The operation piston 3 is mounted outside the friction piston 1, and the friction piston 1 and the operation piston 3 may be mounted to receive together hydraulic pressure of the same pressure chamber 11.

The operation piston 3 is coaxially mounted outside the friction piston 1 and a second separation wall W2 may be disposed between the friction piston 1 and the operation piston 3 so that the hydraulic pressure which is supplied to the friction piston 1 and the hydraulic pressure which is supplied to the operation piston 3 may be independently controlled.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A clutch device for a transmission, the clutch device comprising:
    a first body and a second body coaxially mounted to the first body;
    a friction element mounted between the first body and the second body;
    a friction piston configured to in an axial direction press the friction element by use of hydraulic pressure;
    a retractable mechanism including a dog clutch, which is configured to restrict rotation between the first body and the second body, and configured so that, by repetition of release after application of pressure along the axial direction, at one time the dog clutch establishes an engaged state and at the other time, the dog clutch establishes a disengaged state;
    an operation piston configured to provide pressure to the retractable mechanism in the axial direction of the retractable mechanism,
    wherein the dog clutch of the retractable mechanism includes:
        a first dog gear formed on an external surface of the first body; and
        a second dog gear, and
    wherein the retractable mechanism further includes:
        a dog housing restricted in rotation and axial movement by the second body;
        a dog ring slidably mounted in the dog housing and having the second dog gear on an internal surface thereof to form the dog clutch by engaging with the first dog gear;
        a return spring mounted to apply an elastic force to the dog ring in a direction opposite to a direction of the pressure applied by the operation piston; and
        a switch ring slidably mounted in the dog housing and moving the dog ring using the pressure applied by the operation piston so that the dog ring is rotated in a direction with respect to the dog housing when the dog ring comes out of the dog housing.

2. The clutch device of claim 1, wherein surfaces that axially face each other in the first dog gear of the first body and the second dog gear of the dog ring are inclined surfaces that are parallel with each other.

3. The clutch device of claim 2,
    wherein dog ring protrusions that are inserted into the dog housing and are guided to axially slide are formed on an external surface of the dog ring; and
    wherein holding grooves that receive the dog ring protrusions to keep the second dog gear of the dog ring engaged with the first dog gear of the first body, and release grooves that guide the inserted dog ring protrusions to freely axially move are alternately formed on an internal surface of the dog housing in a circumferential direction thereof.

4. The clutch device of claim 3, wherein surfaces that axially face each other in first separation walls between the holding grooves and the release grooves of the dog housing and the dog ring protrusions are inclined surfaces that are in parallel with each other.

5. The clutch device of claim 4,
    wherein the switch ring has switching portions having inclined surfaces that are parallel with the inclined surfaces of the dog ring protrusions; and
    wherein the inclined surfaces of the switching portion are formed to extend from positions corresponding to middle portions of the release grooves to positions corresponding to middle portion of the first separation walls.

6. The clutch device of claim 5, wherein a dog holding gear which is configured to be engaged with the first dog gear when the second dog gear of the dog ring is disengaged from the first dog gear is integrally formed on an internal surface of the switch ring.

7. The clutch device of claim 5, wherein a dog holding ring having a dog holding gear which is slidably inserted into the dog housing and is configured to be engaged with the first dog gear when the second dog gear of the dog ring is disengaged from the first dog gear is further mounted between the switch ring and the operation piston.

8. The clutch device of claim 1, wherein the operation piston is coaxially mounted outside the friction piston, and the friction piston and the operation piston are configured to receive together hydraulic pressure of a same pressure chamber.

9. The clutch device of claim 1, wherein the operation piston is coaxially mounted outside the friction piston and a second separation wall is mounted between the friction piston and the operation piston so that hydraulic pressure which is supplied to the friction piston and hydraulic pressure which is supplied to the operation piston are configured to be independently controlled.

10. The clutch device of claim 1, wherein the friction element is a disc set formed by alternately disposing a predetermined number of discs and plates.

11. The clutch device of claim 1, wherein the friction element is a conical friction clutch having a conical friction surface.

12. A clutch device configured for a transmission, the clutch device comprising:
    a first body and a second body coaxially mounted outside of the first body;
    a friction element configured to generate friction between the first body and the second body;
    a friction piston configured to increase friction of the friction piston by applying pressure to the friction element; and
    a restriction maintainer configured to restrict relative rotation of the first body and the second body after pressure applied to the friction element by the friction piston is removed,
    wherein the restriction maintainer includes:
        a retractable mechanism including a dog clutch, which is configured to restrict relative rotation of the first body and the second body, and configured so that, by repetition of release after application of pressure along an axial direction, at one time the dog clutch establishes an engaged state and at the other time, the dog clutch establishes a disengaged state; and
        an operation piston configured to provide pressure to the retractable mechanism in the axial direction of the retractable mechanism,
    wherein the dog clutch of the retractable mechanism includes:
        a first dog gear formed on an external surface of the first body; and
        a second dog gear, and
    wherein the retractable mechanism further includes:
        a dog ring configured to axially slide in the second body and having the second dog gear on an internal surface thereof to form the dog clutch by engaging with the first dog gear;

a return spring mounted to apply an elastic force to the dog ring in a direction opposite in a direction of the pressure applied by the operation piston; and a switching mechanism configured for switching a state in which the second dog gear of the dog ring is engaged with the first dog gear even though the pressure which is repeatedly applied from the operation piston is removed, and a state in which the second dog gear is disengaged from the first dog gear when the pressure from the operation piston is removed.

13. The clutch device of claim 12, wherein the switching mechanism includes:

dog ring protrusions formed to protrude from an external surface of the dog ring so that axial sliding thereof is guided by the second body;

release grooves formed on an internal surface of the second body to guide axial sliding of the dog ring protrusions;

holding grooves alternately formed with the release grooves on the second body so that the second dog gear keeps engaged with the first dog gear, by receiving the dog ring protrusions when elasticity of the return spring is greater than pressure of the operation piston;

inclined surfaces formed to be inclined with respect to an axial direction of the clutch device and to be parallel with each other at portions where end portions of first separation walls, which are formed between the release grooves and the holding grooves, and the dog ring protrusions axially face each other; and a switch ring inserted into the release grooves of the second body to axially slide, configured to move the dog ring toward the return spring by pushing the dog ring protrusions using the pressure provided by the operation piston, and having inclined surfaces being parallel with inclined surfaces of the dog ring protrusions at portions being in contact with the dog ring protrusions.

14. The clutch device of claim 13, wherein a dog holding gear which is configured to be engaged with the first dog gear when the second dog gear of the dog ring is disengaged from the first dog gear is integrally formed on an internal surface of the switch ring.

15. The clutch device of claim 13, wherein a dog holding ring having a dog holding gear which is slidably inserted into a dog housing and is configured to be engaged with the first dog gear when the second dog gear of the dog ring is disengaged from the first dog gear is further mounted between the switch ring and the operation piston.

16. The clutch device of claim 12, wherein the operation piston is coaxially mounted outside the friction piston, and the friction piston and the operation piston are configured to receive together hydraulic pressure of a same pressure chamber.

17. The clutch device of claim 12, wherein the operation piston is coaxially mounted outside the friction piston and a second separation wall is disposed between the friction piston and the operation piston so that hydraulic pressure which is supplied to the friction piston and hydraulic pressure which is supplied to the operation piston are configured to be independently controlled.

* * * * *